(12) United States Patent
Ferdman et al.

(10) Patent No.: US 9,384,058 B2
(45) Date of Patent: Jul. 5, 2016

(54) METHOD FOR EXECUTING VIRTUAL APPLICATION DELIVERY CONTROLLERS HAVING DIFFERENT APPLICATION VERSIONS OVER A COMPUTING DEVICE

(75) Inventors: Ilia Ferdman, Tel Aviv (IL); Gil Shulman, Ramat Gan (IL); Uri Bechar, Tel Aviv (IL); Giora Tenne, Tel Aviv (IL); Nissim Nisimov, Moshav Bizaron (IL); Orit Rotem, Moshav Hagor (IL)

(73) Assignee: Radware, Ltd., Tel Aviv (IL)

( * ) Notice: Subject to any disclaimer, the term of this patent is extended or adjusted under 35 U.S.C. 154(b) by 604 days.

(21) Appl. No.: 13/405,862

(22) Filed: Feb. 27, 2012

(65) Prior Publication Data

US 2012/0227039 A1 Sep. 6, 2012

Related U.S. Application Data

(60) Provisional application No. 61/448,472, filed on Mar. 2, 2011.

(51) Int. Cl.
*G06F 9/46* (2006.01)
*G06F 9/50* (2006.01)

(52) U.S. Cl.
CPC ............ *G06F 9/5077* (2013.01); *G06F 9/5027* (2013.01)

(58) Field of Classification Search
None
See application file for complete search history.

(56) References Cited

U.S. PATENT DOCUMENTS

| 6,434,708 | B1 | 8/2002 | Dunnihoo et al. |
| 8,204,082 | B2 * | 6/2012 | Jungck et al. ................. 370/498 |
| 2007/0274321 | A1 | 11/2007 | Jonsson et al. |
| 2009/0319580 | A1 * | 12/2009 | Lorenz et al. ................. 707/203 |
| 2010/0114825 | A1 | 5/2010 | Siddegowda |
| 2010/0284404 | A1 | 11/2010 | Gopinath et al. |
| 2010/0332617 | A1 * | 12/2010 | Goodwin et al. ............. 709/219 |
| 2011/0138384 | A1 | 6/2011 | Bozek et al. |
| 2011/0149755 | A1 | 6/2011 | Gandhewar et al. |
| 2011/0280244 | A1 | 11/2011 | Gopinath et al. |

OTHER PUBLICATIONS

Yang Yu et al., "A Feather-weight Virtual Machine for Windows Applications," Article in VEE Conference, Jun. 2006.

* cited by examiner

*Primary Examiner* — Wissam Rashid
(74) *Attorney, Agent, or Firm* — M&B IP Analysts, LLC

(57) ABSTRACT

A method for executing virtual application delivery controllers (vADCs) having different application versions over a computing device. The method comprises installing a virtualization infrastructure in the computing device; creating by the virtualization infrastructure a plurality of vADCs having different application versions, wherein each vADC is created from a software image maintained in a hardware infrastructure of the computing device; gathering version information associated with each of the plurality of vADCs; independently executing the plurality of vADCs over an operating system of the computing device; and controlling the execution of the plurality of the vADCs over an operating system of the computing device using the virtualization infrastructure using in part the version information. In one embodiment, each of the plurality of vADCs does not execute its own guest operating system.

20 Claims, 8 Drawing Sheets

| TS1 | TS2 | TS3 | TS4 | TS5 | TS6 | TS7 | TS0 | TS8 | TS9 | TS10 | TS11 | TS12 |
|---|---|---|---|---|---|---|---|---|---|---|---|---|
| vADC 611 | vADC 611 | vADC 611 | vADC 612 | vADC 612 | vADC 613 | vADC 611 | TB 140 | vADC 611 | vADC 611 | vADC 612 | vADC 612 | vADC 613 |

US 9,384,058 B2

METHOD FOR EXECUTING VIRTUAL APPLICATION DELIVERY CONTROLLERS HAVING DIFFERENT APPLICATION VERSIONS OVER A COMPUTING DEVICE

CROSS REFERENCE TO RELATED APPLICATIONS

This application claims the benefit of U.S. provisional application No. 61/448,472 filed on Mar. 2, 2011, the contents of which are herein incorporated by reference.

TECHNICAL FIELD

This invention generally relates to virtualizations of application delivery controllers (ADCs).

BACKGROUND

An application delivery controller (ADC) is a network device installed in a datacenter or multi-datacenter system to remove load from web servers in the datacenter. That is, an ADC typically distributes clients' requests between the web servers in a datacenter to balance the load. In a multi-datacenter system, an ADC is deployed in each datacenter to redirect clients' requests to a datacenter that would best serve such requests. Typically, the redirection decision is based on the location of the client from the datacenter. The ADC is a network device and, as such, includes computing resources, such as memory, one or more central processing units (CPU), storage, network connectivity, and so on.

A virtual machine (VM) is a software implementation of a computer that executes programs like a physical machine. The virtualization technology decouples the hardware from the software, thus allows the sharing of the underlying physical hardware resources between different virtual machines, each running its own operating system (guest). Thus, the virtualization, which is typically performed by a hypervisor, allows multiple operating systems to run concurrently on a host computer. The hypervisor presents the guest operating systems with a virtual operating platform and monitors the execution of the guest operating systems. Further, the hypervisor defines the allocation of resources (e.g., CPU power, memory, network bandwidth, etc.) for each guest operating system.

Virtualization of an ADC device can improve the performance of datacenters and reduce costs and overhead to the service providers. Similar to any other data center application, the ADC devices of different customers or applications can be consolidated as multiple virtual ADC instances running on a single hardware device. A straightforward approach to achieve this process would be to run a conventional hypervisor to control one or more ADC virtual machines. However, conventional hypervisors are primarily designed to support virtualization of general purpose computing devices, e.g., servers, and not network devices, such as ADCs. Network elements are measured by their high forwarding capacity and low latency, unlike server applications that are measured by their capacity of CPU intensive task processing. For example, conventional virtualization solutions cannot guarantee low latency when processing data packets, and further, their throughput and capacity is limited as only a small number of virtual machines can be executed on a physical computing device.

To improve the utilization of ADC resources, multiple ADC virtual machines should be independently executed in a signal device. The straightforward approach is that the hypervisor executes a guest operating system within an ADC virtual machine created by the hypervisor. Thus, the ADC virtual machine runs its own operating system. Further, the hypervisor creates and controls by the virtual machines. Such an approach may limit the independency of the ADC virtual machines executed by the hypervisor and their performances.

Therefore, the straightforward and conventional virtualization solutions are not optimized to support efficient virtualization of ADCs.

SUMMARY

Certain embodiments disclosed herein include a method for executing virtual application delivery controllers (vADCs) having different application versions over a computing device. The method comprises installing a virtualization infrastructure in the computing device; creating by the virtualization infrastructure a plurality of vADCs having different application versions, wherein each vADC is created from a software image maintained in a hardware infrastructure of the computing device; gathering version information associated with each of the plurality of vADCs; independently executing the plurality of vADCs over an operating system of the computing device; and controlling the execution of the plurality of the vADCs over an operating system of the computing device using the virtualization infrastructure using in part the version information. In one embodiment, each of the plurality of vADCs does not execute its own guest operating system.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
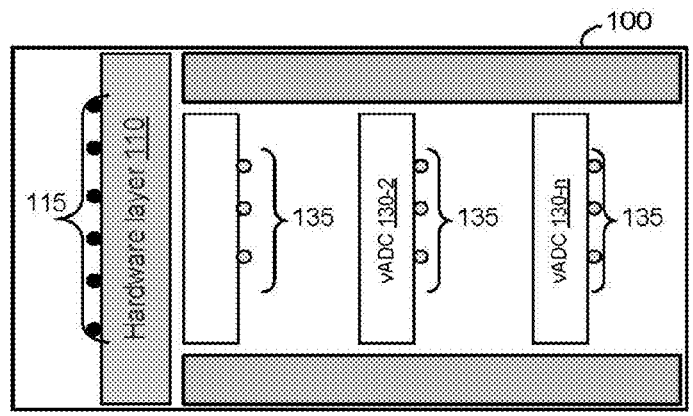
FIG. 1 is a block diagram of a virtualized ADC device according to an embodiment of the invention.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating the architecture of a virtualized ADC device 100. According to the techniques disclosed herein a virtualized ADC device is a physical computing device that can execute a plurality of instances of virtual ADCs (hereinafter vADC). The physical computing device may include, for example, a server, a blade server, a blade system, a multi-blade device, and a network device, such as a load balancer, an application delivery controller, and the like.

As illustrated in FIG. 1, the virtualized ADC device 100 includes a hardware layer 110 that comprises the computing resources of the device 100. The computing resources include, but are not limited to, one or more central processing units (CPUs), each CPU with one or more processing cores, a system memory, a storage disk, a system board, a memory management unit, registers, network ports, and so on. A single operating system (OS) is executed over the hardware layer 110. The OS may be, but is not limited to, a Windows-based operating system, a Linux based operating system, a UNIX based operating system, VXwork6, and the like.

The computing resources of the hardware layer 110 are managed by a management module 120. Specifically, the management module 120 sets the various components of the hardware layer 110, defines network parameters and addresses, supervises the allocation of device resources, creates, and halts vADC processes. A user (e.g., a system administrator) can access the management module 120 using, for example, a Web-based application, a SNMP-based application, a command-line interface (CLI), web services API, and the like.

In the virtualized ADC device 100, one or more vADCs 130-1 through 130-n are created and executed. Each of the vADC 130-1 through 130-n is a process that acts logically as a physical ADC device. That is, each vADC 130-i (i=1, 2, ..., n) performs the tasks of a physical ADC device. These tasks include, but are not limited to, load balancing of traffic, traffic acceleration, traffic compression, traffic caching, SSL offloading, and so on. Each vADC 130-i has a separate networking configuration, a MAC address, and an application delivery configuration. It should be noted that a vADC 130-i process does not execute its own guest operating system, as conventionally performed by virtual machines. The traffic distributor 140 directs incoming traffic to one or more of the vADCs 130 and routes traffic between the vADCs 130. The traffic distributor 140 also schedules the execution of the vADC on the CPU cores of the device 100.

In accordance with an embodiment, the management module 120, vADCs 130, and traffic distributor 140, communicate using a virtualization communication protocol (VCP). The VCP provides software independency of the vADCs 130-1 through 130-n from the underling hardware layer 110 and its operating system. This allows independently executing multiple vADCs 130-1 through 130-n, where each vADC may be of a different version and execution logic. As a result, service providers can choose which application version and which vADC to run. The service providers can also choose which vADC to upgrade, thus enabling partial system upgrades (software upgrade). It should be appreciated that a partial system upgrade minimizes the risks of introducing new software versions and reduces the overall downtime of a datacenter.

Each of the plurality of vADCs 130 is independently managed. That is, each vADC manages its own configuration, user privileges, alerts, and reports. This allows, for example, setting different privileges to different vADCs running on a virtualized vADC device. The various embodiments for executing different vADCs in a virtualized ADC device are discussed in greater detail below.

Figure 2:
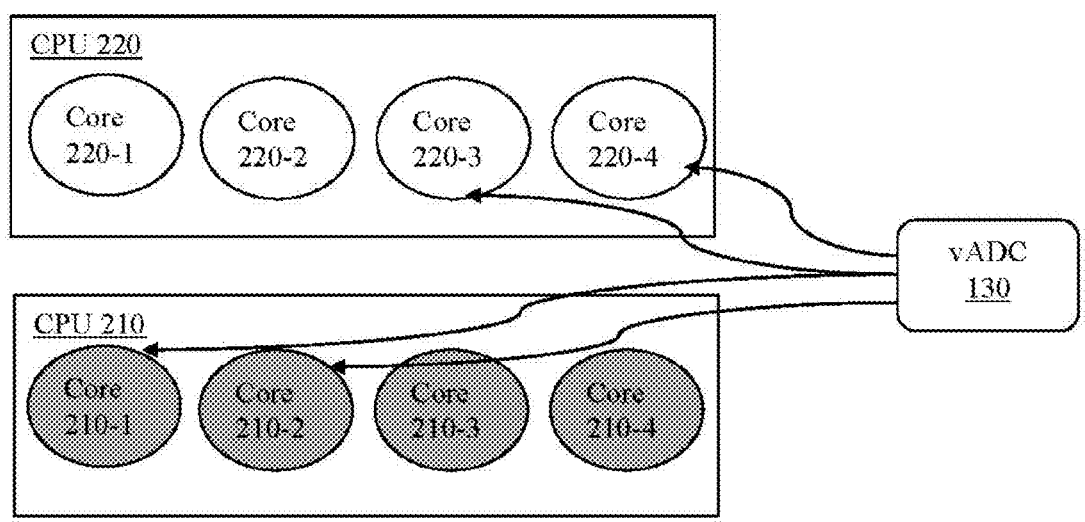
FIG. 2 is a diagram illustrating the execution of a vADC on multiple cores.

In accordance with an embodiment, a vADC can be executed on a single core, a part of a core, or multiple cores of one or more CPUs. As illustrated in FIG. 2, each of CPUs 210 and 220 includes 4 cores, 210-1 through 210-4 and 220-1 through 220-4. The CPUs are part of the hardware layer of the virtualized ADC device. A vADC 130-i can run on any combination of cores 210-1 through 210-4 and 220-1 through 220-4. In the example shown in FIG. 2, a vADC 130 runs on cores 210-1 and 210-2 of the CPU 210 as well as cores 220-3 and 220-4 of the CPU 220. The selection of CPU cores is described in detail below.

Referring back to FIG. 1, a vADC 130-i is exposed to the network as a separate network device set with its own set of virtual internal ports 135. However, data traffic of a vADC 130-i is actually sent and received through the physical external ports 115 of the virtualized ADC device 100. Each virtual internal port 135 is set with a unique media access control (MAC) address. The number of virtual internal ports 135 assigned to each vADC 130 is bounded by the number of external ports 115. That is, the number of virtual internal ports 135 of a vADC 130-i cannot exceed the number of the external ports 115.

In accordance with certain embodiments, association between internal ports and external ports may be performed using either a dedicated port topology or shared port topology. The dedicated port topology assumes full network infrastructure separation between vADCs 130 running on the same virtualized ADC device 100. That is, a specific external port 115 is associated with an internal port 135 of a single specific vADC 130. In a shared port topology, two or more different vADCs 130-1 through 130-n can share the same external port 115, where traffic separation is performed according to VLAN association and destination MAC addresses.

The traffic which flows within the virtualized ADC device 100 can be logically divided into two groups: external traffic, i.e., traffic received through the external ports 115, and internal traffic, i.e., traffic generated by the virtualized ADC's components, i.e., the vADCs 130, the management module 120, the hardware layer 110, the traffic distributor 140, and so on. Primarily, external traffic should be load-balanced. The internal traffic carries configuration updates, event notification, and statistical information.

Incoming external traffic, received through one of the external ports 115, is sent to one of the vADCs 130 selected by the traffic distributor 140. Specifically, first, a packet arrives to the virtualized ADC device 100, through one or more external ports 115, and is processed by the hardware layer 110 (e.g., an Ethernet MAC controller). Then, processed packets are sent to the traffic distributor 140 that selects a vADC 130-i for processing the packets according to one or more of the VLAN tags, MAC addresses, or any other layer-2 parameters designated in the packets and a vADC selection process. The traffic distributor 140 may also select between one or more cores (either physical or logical CPU cores) within the selected vADC 130 based, in part, on layer 3 or layer 4 (TCP/IP) parameters of the OSI model. The vADC selection process is described in detail below.

The traffic distributor 140 also checks if an incoming packet should be cloned and sent to multiple destinations. For example, if an incoming packet is a broadcast packet or has an unknown destination MAC address, the traffic distributor 140 clones the packet and sends copies of the same packet, to multiple vADCs 130 on the same layer 2 VLAN that that the packet arrived from. Finally, packets received at a vADC 130-$i$ ($i=1, 2, \ldots, n$) are processed to perform the tasks defined for the vADC 130-$i$. Such tasks may include, for example, distributing packets between web servers, or any other ADC's functions.

In the transmit direction, packets processed by a vADC 130-$i$ are returned to the traffic distributor 140, which determines the final destination of each outgoing packet. Packets that should be sent outside of the virtualized ADC device 100 are forwarded to the hardware layer 110 which transmits the packets through the external ports 115 to its destination. The destination external port is determined according to, for example, layer-2 parameters (e.g., destination MAC address) of the packets or any other indicator. Packets can also be sent from a vADC 130-$i$ to an internal destination port or ports for processing by other vADC or vADCs 130-$i$. The processes for traffic distribution from/to vADCs and between vADCs are described below with reference to FIGS. 7 and 8.

Figure 3:
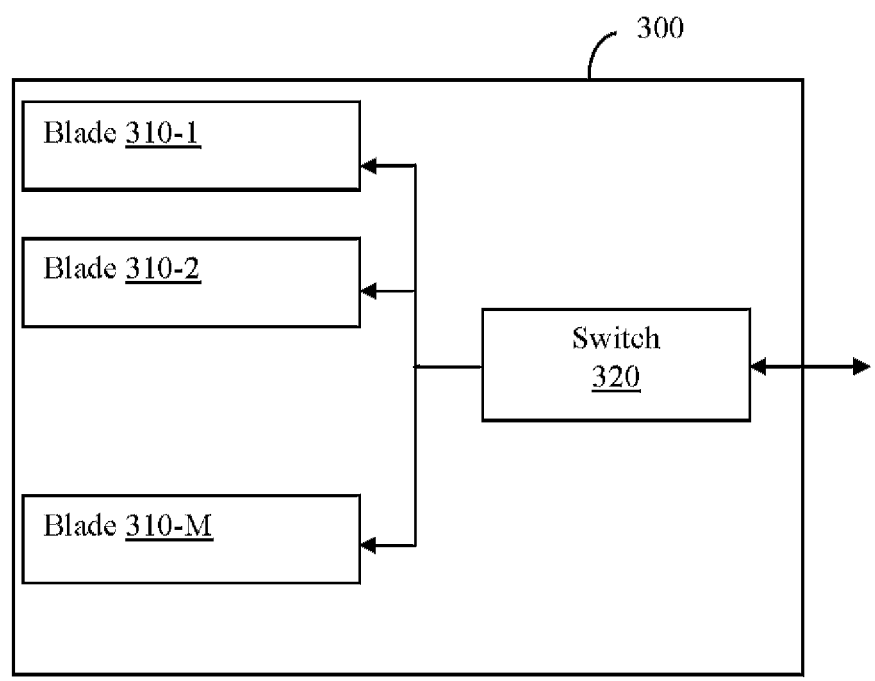
FIG. 3 is a diagram of a multi-blade system utilized to describe an embodiment of the invention.

FIG. 3 schematically illustrates a multi-blade system 300 that includes a plurality of blade servers 310-1 through 310-M and a switch 320. According to certain embodiments of the invention, vADCs can be executed on the multi-blade system 300. The switch 320 determines to which blade server 310-$j$ ($j=1, 2, \ldots, M$) to distribute an incoming traffic. In accordance with one embodiment, ADC virtualization may be performed on a set of blade servers including one or more of the blade servers 310-1 through 310-M, where the switch 320 participates in the functionality of the traffic distributor 140. This embodiment allows executing several virtualized ADC devices in parallel, to execute a single virtualized ADC device on several blade servers 310-1 through 310-M, or combination thereof. Thus, a vADC can be executed in parallel on different blade servers 310-1 through 310-M.

As a non-limiting embodiment, each of the blade servers 310-1 through 310-M acts a virtualized ADC device, such as the device 100 illustrated in FIG. 1. In such an embodiment, the switch 120 selects to which of the blade servers (e.g., to server 310-2) to distribute an incoming traffic. The blade server receiving the incoming traffic forwards it to one of its vADC instances by means of its traffic distributor. The switch 120 selects the destination blade server based on one or more of the VLAN tags, MAC addresses, or any other layer-2 parameters designated in the incoming packets. In an embodiment, the switch 320 performs a selection process described in detail below with a reference to FIG. 4.

In accordance with various embodiments disclosed herein, computing resources allocated for a vADC 130-$i$ are defined in terms of an ADC capacity unit (ADC-CU). An ADC capacity unit is an atomic, not dividable, block that encapsulates various computing resource parameters. The computing resource parameters include, but are not limited to, computation resources, memory resources, a number of concurrent allowable connections, a configuration limit, a network bandwidth, a number of new connections per second, storage resources, secure sockets layer (SSL) hardware processing resources, and compression hardware processing resources. The parameters may be related to computing resources that are internal and/or external to the virtualized ADC device performing the virtualization.

A virtualized ADC device can serve one or more capacity units. With this aim, the computing resources of the device or array of devices (e.g., a multi-blade system) are equally divided into the number of capacity units that can be supported by the device. One or more capacity units can be allocated to a vADC.

The computation resources parameter defines the number of CPU cores and part of cores that can run a vADC 130-$i$. The percentage of memory resources defines an amount of memory in bytes to be allocated per vADC 130-$i$. The percentage of total device bandwidth defines the percentage of total device bandwidth allocated for a vADC 130-$i$. If this limit is exceeded on a vADC 130-$i$, the packet may be dropped. The percentage of storage devices parameter defines an amount of storage space in Mbytes that are available for a vADC 130-$i$. This parameter includes several values for each system storage device. The concurrent connection limit parameter defines a maximal number of sessions that a vADC 130-$i$ can handle in parallel. The configuration limit defines a maximal number of VIPs, servers, and proxy IPs that can be configured per vADC. The percentage of secure sockets layer (SSL) capabilities defines the number of new SSL connections that a vADC 130-$i$ is allowed to process. The percentage of compression hardware capabilities parameter defines the amount of bytes that a vADC 130-$i$ is allowed to compress/decompress. The percentage of HTTP object caching memory resources defines the number of bytes that a vADC 130-$i$ is allowed to store in caching memory.

It should be noted that the number of capacity units and percentage of system resources allocated for each ADC capacity unit may vary from one virtualized ADC device (or a multi-blade system) to another, depending on the virtualized ADC device and its hardware configuration. For example, the amount of memory allocated for each ADC capacity unit depends on the amount of memory included in a particular device, the number of CPU cores, and so on. A virtualized ADC device 100 may offer one or more ADC capacity unit configurations for a selection by a user. For example, one configuration of the device offers a small number of large capacity units, and a second configuration of the device offers a larger number of small capacity units. This allows the user of a device 100 to upgrade or downgrade the utilization of the computing resources, on-demand. It should be appreciated that the multiple configurations capacity units for a virtualized ADC device 100 is beneficial in "cloud computing applications" where the utilization of resources is dynamically changed. According to one embodiment, each ADC capacity unit configuration may be associated with a different price.

A maximum allowable of capacity units ($CU_{MAX}$) for the virtualized ADC device are set, for example, by a system administrator. An ADC capacity unit is defined to include a $CU_{MAX}$-portion of each resource parameter defined above. That is, an ADC capacity unit may be defined as follows:

$$CU=\{SP\_C\#/CU_{MAX}; MEM/CU_{MAX}; BW/CU_{MAX};$$
$$CONN./CU_{MAX}; cVIP, cRS, cPIP,$$
$$STOR/CU_{MAX}; SSL/CU_{MAX}; CMP/CU_{MAX}\}$$

where "SP_C#" is the number of available CPU cores, "BW" is the system maximal theoretical throughput, "MEM" is the amount of available memory, "CONN" is the maximal number of concurrent connections for the vADC 130-$i$ to handle at each point of time, "STOR" is the free space on storage device(s) available for applications' execution, "SSL" is a SSL HW capacity to open new SSL connections, "CMP" is compression HW throughput capacity to process incoming byte stream, and cVIP, cRS, cPIP is a maximum number of VIPs, real servers and proxy IP, respectively, that totally should be supported per ADC capacity unit (these numbers are defined by a system administrator).

Figure 4:
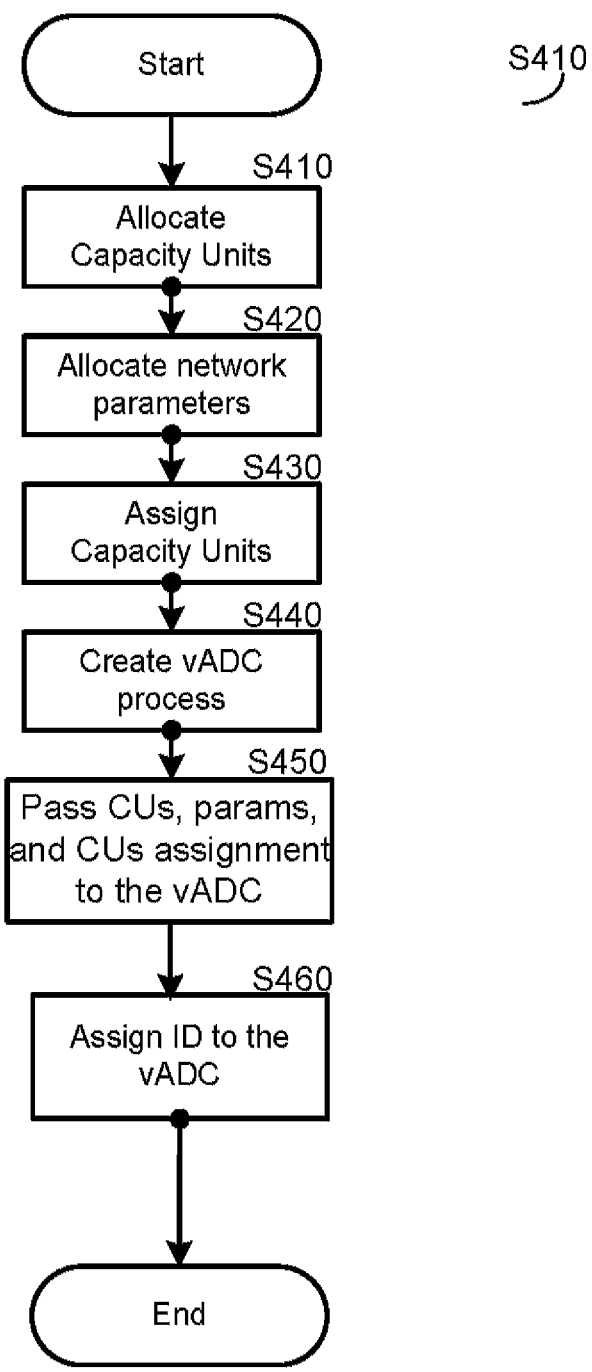
FIG. 4 is a flowchart illustrating the process for creating a vADC according to an embodiment of the invention.

FIG. 4 is a non-limiting flowchart 400 illustrating a process for creating a vADC in accordance with an embodiment. As mentioned above, a vADC provides the functionality of a physical ADC device deployed in a datacenter. The creation of vADCs is controlled by the management module 120. In an embodiment, the creation of vADC 130-$i$ initializes a vADV instance in the device 100. As mentioned above, multiple vADV instances can reside and operate in parallel in the device 100.

At S410, the management module 120 tries to allocate the number of capacity units requested by a user (e.g., a system administrator) for a newly created vADC. At S420, network parameters, such as a MAC address and a management IP address, are allocated for a vADC to be created.

At S430, the allocated capacity unit(s) is assigned to a vADC. Specifically, S430 includes selection of CPU cores, or portions thereof, and memory for executing the newly created vADC. In accordance with an embodiment, such selection is performed to achieve a balanced system by minimizing the difference in a number of capacity units running on every CPU core. The balance is reached by dispersing vADCs across CPU cores. In another embodiment, the selection tries to minimize latency impact caused by executing several vADCs on the same core, by assigning a CPU core to a single vADC. Step S430 will be now described in more detail with reference to FIG. 5.

Figures 5, 6:
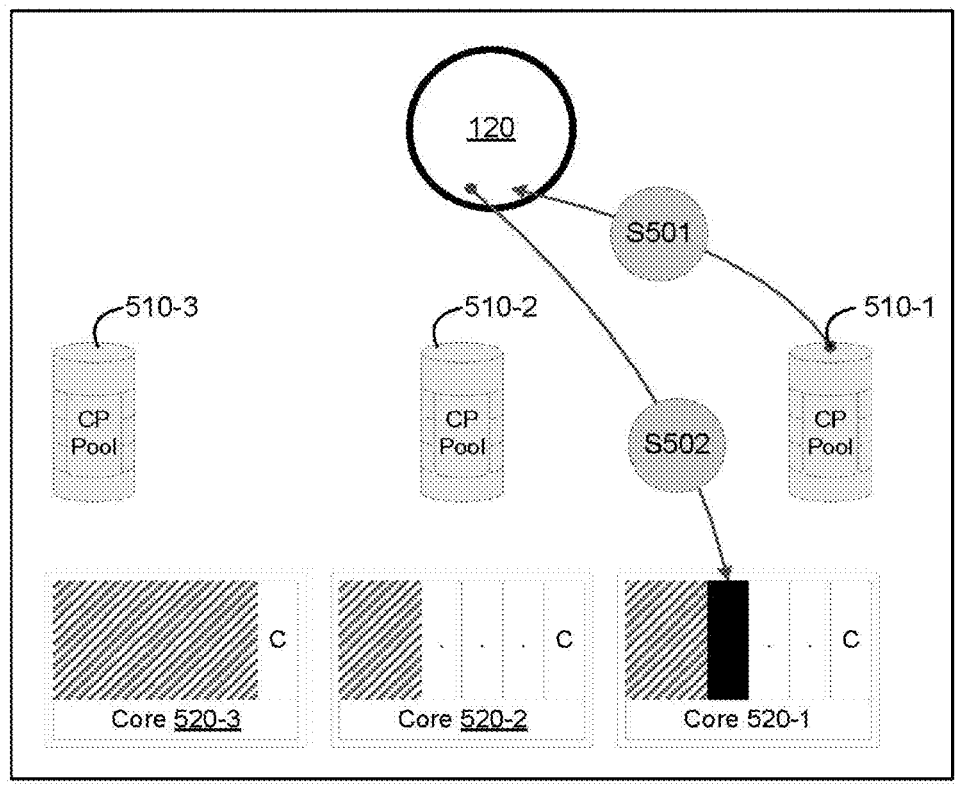
FIG. 5 is a diagram illustrating the process of allocating capacity units to a created vADC.
FIG. 6 is a diagram illustrating the scheduling process according to an embodiment of the invention.

In a virtualized ADC device 100, every CPU core and memory attached to this core are initially divided into a predefined number of capacity partitions (CP). The dimension parameters of capacity partitions (core percentage and memory size) will be equal to the computation resources, and memory resources parameters in the capacity units. The number of capacity partitions coexisting in the device 100 should be equal to the number of the maximum capacity units, one partition for every capacity unit. A list of capacity partitions available for allocation on a specific core is maintained in virtual pools 510 of free capacity partitions, one virtual pool 510 for every CPU core 520. As depicted in FIG. 5, there are 3 virtual pools 510-1, 510-2, and 510-3 for 3 CPU cores 520-1, 520-2, and 520-3.

The allocation of the requested capacity units to the created vADC includes selecting on which CPU core or cores and from which memory the newly created vADC will run. At S501, allocation of capacity partitions from the respective virtual pool 510 of the selected core 520 is performed. This allows for reserving, on the selected core, a percentage of computation resources and an amount of memory. Then, at S502, the CPU core (e.g., 520-2), or cores selected to run, is instructed to behave in accordance to new resource reservation. In an embodiment, the allocation is performed by the management module 120.

Referring back to FIG. 4, at S440, an instantiation of a vADC (e.g., vADC 130-$i$) takes place. At S450, the network parameters, ADC capacity unit allocation as well as the assignment information are passed to the created vADC. At S460, a unique identification (ID) number is assigned to the vADC. The ID number may be utilized, for example, to communicate with the vADC.

In accordance with an embodiment of the invention, capacity units allocated and assigned to a created vADC can be modified during the runtime of the vADC. That is, one or more capacity units may be added or de-allocated from a running vADC, without halting the vADC. In another embodiment, a vADC can be migrated from one virtualized ADC device to another. As mentioned above, each virtualized ADC device is characterized with different computing resources, thus when migrating vADCs between devices, allocated capacity units are converted accordingly.

Further, a created instance of a vADC can be deleted when it is no longer required. The process for deleting a vADC instance can be initiated by the system administrator. The process includes destroying the vADC running one or more CPU cores, and de-allocating the networking parameters, capacity units, and reserved computing resources.

In order to allow low latency of packets processing the vADCs 130 and to ensure that every vADC 130-$i$ can fully utilize the CPU resources allocated by its capacity unit(s), a scheduling process is implemented by the traffic distributor 140. The scheduling process schedules between several vADCs 130-1 through 130-$n$ sharing the same CPU core. vADCs running on different CPU cores process packets independently, thus scheduling between such vADCs is not required.

In accordance with an embodiment, a time slice which is the minimum time window that a vADC 130-$i$ can receive for utilizing a CPU core is set to an initial value. In an exemplary embodiment, the time slice is set to 25 microseconds.

Then, for each vADC to be executed on a CPU core, the process allows the execution of the vADC during a consecutive number of time slices equal to the number of capacity units for that vADC on that core. Once a vADC consumes its time slice or slices, the scheduling process provides execution time for the next vADC in line. The scheduling between vADCs may be performed in a round-robin manner or any other scheduling algorithm. In an embodiment, the scheduling process ensures a particular vADC 130-$i$ does not wait more than a predefined time period to receive execution time on a CPU core. This waiting time period determines the latency of the processing tasks by a vADC 130-1, thus the latency of the virtualized ADC device. It should be appreciated that the latency is configurable, and hence can be set to optimally serve network processing tasks performed by the vADC.

An example for the scheduling process is provided in FIG. 6, where 3 vADCs 611, 612, and 613 are executed on a single CPU core. The capacity units allocated for vADCs 611, 612, and 613 are 3, 2, and 1 respectively. As can be noticed, vADC 611 is executed during time slices TS1, TS2, TS3, and TS7, TS8, TS9; vADC 612 runs at time slices TS4, TS5 and TS10, TS11; and vADC 613 is executed during time slices TS6 and TS12. The time slice TS0 is reserved for the traffic distributor (TD 140).

In the example provided in FIG. 6, the maximum latency is 7 time slices. For example, in the worst case illustrated in FIG. 6, the vADC 613 waits 6 time slices until it can be executed on a CPU core. The best case shown in FIG. 6 is for vADC 611 that waits only 4 time slices for its execution.

In accordance with an embodiment, during its execution a vADC can borrow additional resources. This feature allows for the efficient processing of burst traffic. To this end, a pool of resources (e.g., a pool 510-3 in FIG. 5) is reserved during the initialization of the virtualized ADC device 100. Then, during a runtime of a vADC 130-$i$, additional resources can be temporarily allocated for a configurable limited time period.

In an embodiment, to prevent extensive usage of the reserved pool, statistics are collected about the utilization of the pool of resources by each vADC 130-$i$. vADCs that exceed an allowed quota to borrow are blocked from consumption of the reserved resources and their allocated capacity units may be permanently increased. In certain embodiments, statistics collected on the utilization of capacity units and reserved resources can be reported to the user. Using such information the user may decide to increase/decrease the number of capacity units for a vADC or the number of vADCs executed in the device 100.

Figure 7:
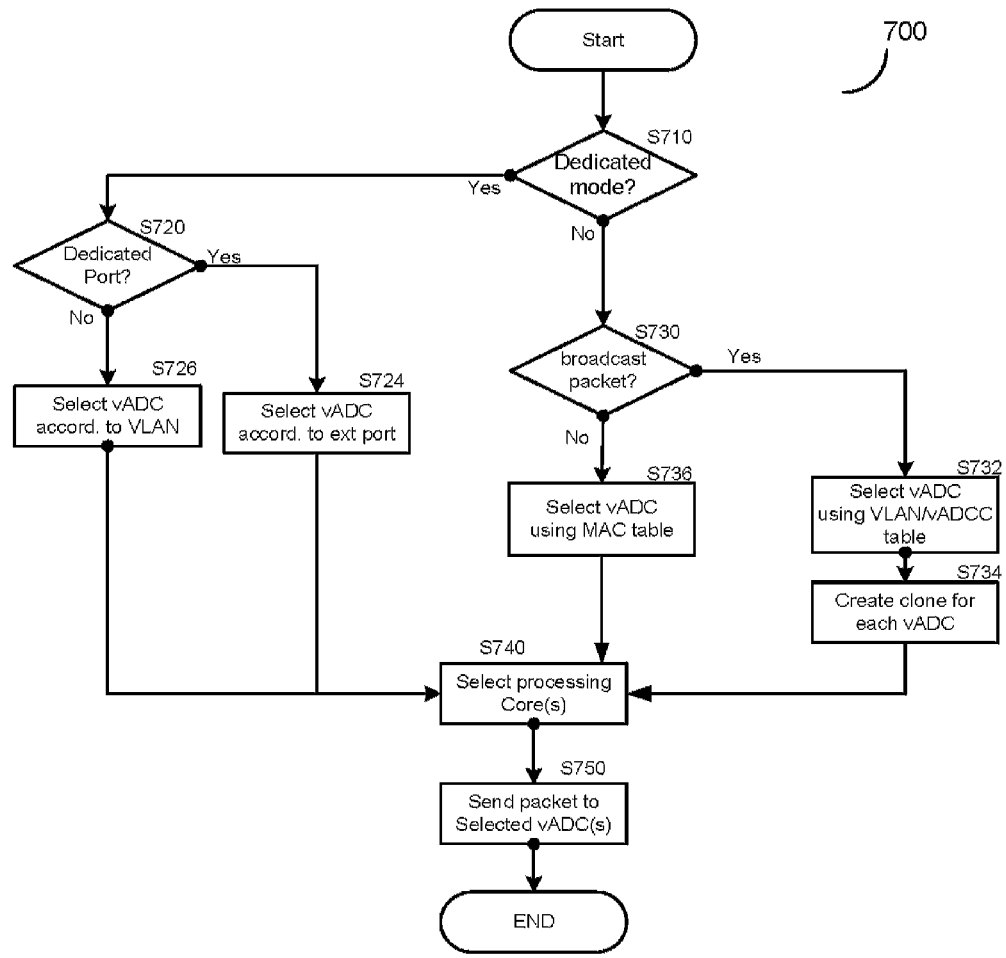
FIG. 7 is a flowchart illustrating a vADC selection process performed according to an embodiment of the invention.

FIG. 7 shows a non-limiting flowchart 700 illustrating the vADC selection process performed by the traffic distributor 140, upon reception of a packet, according to an embodiment. Through the selection process, the traffic distributed 140 determines to which of the vADC 130-1 through vADC 130-n an incoming traffic should be forwarded for processing.

As mentioned above, an association between internal ports and external ports may be performed using either a dedicated port topology or shared port topology. The dedicated port topology assumes full network infrastructure separation between vADCs 130 running on the same virtualized ADC device 100. In a shared port topology, two or more different vADCs 130 can share the same external port 115, where traffic separation is performed according to VLAN association and destination MAC addresses.

At S710, a check is made to determine whether the external port 115 on which an incoming packet was received employs a dedicated topology (mode), and if so, execution continues with S720; otherwise, a shared topology is employed and execution advances to S730.

At S720, another check is made to determine if the external port 115 is bound to a specific vADC 130. The check may be performed based on layer-1 parameters (e.g., layer-1 port setting and port aggregation) of the incoming packet. If S720 results in an affirmative answer, at S724, the vADC to process the incoming packet is selected using an input external port number. Then, execution advances to S740.

If S720 results with a negative answer, at S726, the vADC to process the incoming packet is selected by matching a VLAN tag embedded in the packets to the VLAN-to-vADC translation table, which returns a vADC based on a VLAN tag in the packet. It should be noted that S726 is performed for all types of packets, e.g., broadcast and unicast packets. It should be further noted that if there is no match of a VLAN tag to vADC, the packet is dropped and execution returns an error message.

At S730, it is checked if the packet destination MAC address is a broadcast MAC address, and if so, at S732, the vADC is selected using the VLAN-to-vADC translation table. It should be noted that in this case, multiple vADCs can be returned when matching a single input VLAN tag. At S734, the packet is cloned as the number of vADCs returned at S732. Thereafter, execution continues with S740. If S730 returns a negative answer, the packet is a unicast packet, and at S736, the VLAN tag and destination MAC address are matched against a MAC translation table, which returns a single vADC to process the incoming packet. It should be noted that if the packet includes an unknown destination MAC address, the packet is dropped and an error message is generated. The translation tables mentioned above are preconfigured or can be configured during vADC creation and can be modified by a user (e.g., a system administrator).

At S740, the traffic distributor 140 has to select one of the one or more CPU cores belonging to the selected vADC for the execution of the packet processing. In one embodiment, the selection of the CPU core is based on any of the layer-2, layer-3, and layer-4 headers of the received packet. As an example, a CPU core may be selected by calculating a hash value of the layer-3 or layer-4 headers of the packet. Using the computed hash value, the CPU core(s) is selected for the vADC by considering that on different cores the vADC can use different core share. If the layer-3 (IP) or layer-4 (TCP) parameters are unknown or the packet is the not an IP packet, the packet is sent to a pre-defined core (e.g. core 0). Other embodiments based on functions and distribution policies to select the CPU core(s) for the vADC will be apparent to one of ordinary skill.

At S750, the packet is sent to the selected vADC and CPU core. It should be noted that layer-1, layer-2, layer-3, and layer-4 mentioned herein refer to the layer-1, layer-2, layer-3 and layer-4 defined in the OSI model, i.e., the physical, MAC and TCP/IP layers. It should be noted that when a broadcast packet should be sent to more than one vADC, S740 and S750 are repeated per each vADC.

Figure 8:
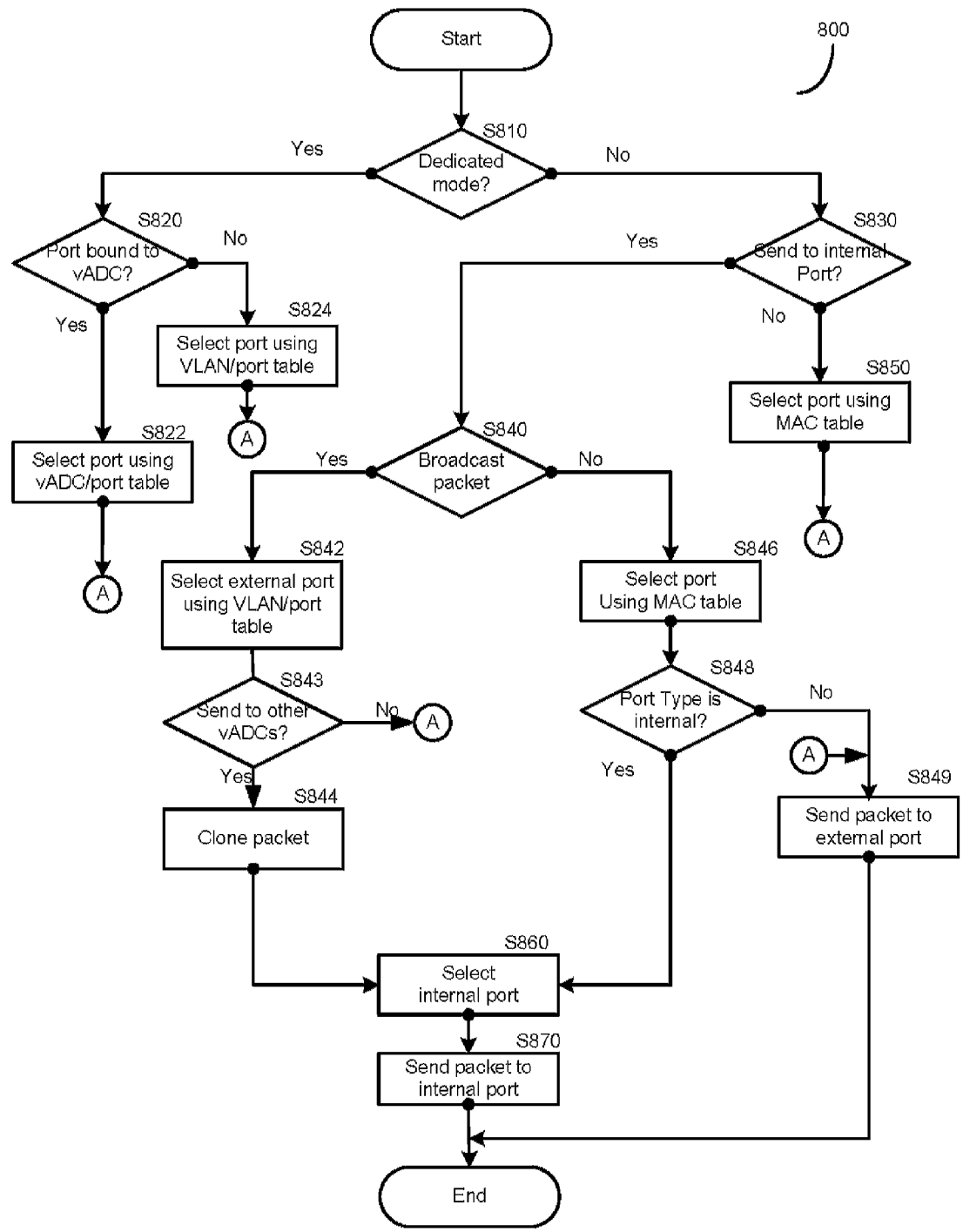
FIG. 8 is a flowchart illustrating the process for routing packets processed by a vADC according to an embodiment of the invention.

FIG. 8 shows a non-limiting and exemplary flowchart 800 illustrating a process for routing packets processed by a vADC, as performed by the traffic distributor 140, according to one embodiment. At S810, it is checked if the external port on which an original packet was received employs a dedicated topology (mode). If so, execution continues with S820; otherwise, a shared topology is employed and execution advances to S830.

At S820, another check is made to determine if an internal port of a vADC that outputs the packet is bounded to a specific external port 115. The check may be performed based on the layer-1 and/or layer-2 parameters (e.g., VLAN tag) designated in the packet. If S820 results with an affirmative answer, at S822, the external port for the packet is selected using a vADC-to-port translation table, which returns a port number of an external port (port 115 FIG. 1) to send the packet. Then, execution continues with S849. If S820 results in a negative answer, at S824, the external port 115 which sends out the packet is selected using a VLAN-to-port translation table, which returns a single port number, based on the VLAN tag in the packet. Then, execution continues with S849.

At S830, it is checked if the packet transmission between vADCs is allowed. If so, at S840, it is further checked if the packet's destination MAC address is a broadcast MAC address. If so, at S842, the external port is selected using the VLAN-to-port translation table. Then, at S843, the VLAN tag of the packet is matched against the VLAN-to-vADC translation table to determine if the packet should be sent to other vADCs, and if so, which one. At S844, the packet is cloned as the number of vADCs matching the VLAN tag. Then, execution continues with S860.

If S840 returns a negative answer, the packet is a unicast packet, and at S846, the destination MAC address is searched in a MAC translation table, which returns a destination port (which may be either internal or external) according to the input MAC address. At S848, it is checked if the type of the port is an internal, and if so, execution continues with S860; otherwise at S849, the packet is sent to the external port.

At S860, a destination internal port is selected based, in part, on the destination IP address of the packet. At S870, the packet is sent to the vADC with the selected internal port.

If S830 results with a negative answer, execution continues with S850 where the destination MAC address of the packet is searched in a MAC translation table, which returns a destination external port according to the input destination MAC address. Then, the packet is sent to the external port. The translation tables mentioned above, with reference to flowchart 800, are preconfigured and can be modified by a user (e.g., a system administrator).

In an embodiment, reception and transmission of packets is performed using a zero copy mechanism implemented by the traffic distributor 140. This mechanism allows packet reception and transmission from/to external interfaces and packet switching between vADC's, without transferring the packets among the virtualized ADC device, and cloning or copying the packets. With this aim, the packets are saved in a shared memory that can be accessed by the vADCs 130 and traffic distributor 140. Thus, instead of, for example, cloning a packet, a pointer to a shared memory is provided to each vADC that should process the packets.

Figure 9:
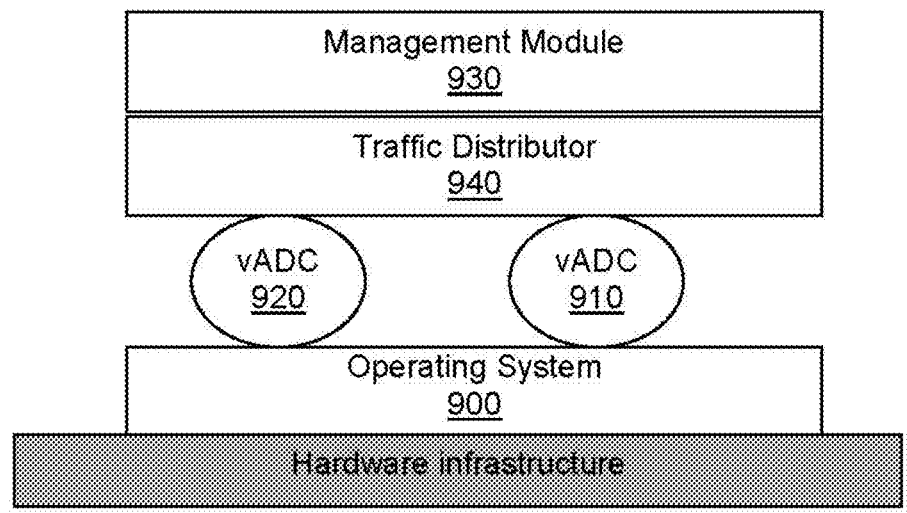
FIG. 9 is a diagram utilized to describe a process for independently executing vADCs having different application versions.

FIG. 9 shows an exemplary diagram utilized to describe a process for independently executing vADCs having different application versions according to certain embodiments disclosed herein. As depicted in FIG. 9, over an operating system 900, two vADCs 910 and 920, a management module 930, and a traffic distributor 940 are executed. It should be noted that for the sake of brevity only two vADCs are shown in FIG. 9, however, the teaching disclosed herein can be applied to any number of vADCs greater than 2.

The operating system 900 may be, but is not limited to, a Windows-based operating system, a Linux based operating system, a UNIX based operating system, VXwork6, and the like. Each of the vADCs 910 and 920 performs the network processing tasks as discussed in greater detail above, for example, with respect to vADCs 130. Each of the vADCs 910 and 920 is a self-contained application that includes all resources, such as executable code, configuration, user privileges, to be independently executed over the operating system 900. Specifically, each of the vADCs 910 and 920 does not run its own operating system (e.g., a guest operation system) and it is not created or managed by the operating system 900.

Each of the vADCs 910 and 920 runs a different application version, each of which is differentiated by its own version of executable code and in some cases configuration. As a result, the vADCs 910 and 920 may perform different network processing tasks, support a different set of processing features, and so on. In addition, one vADC may run an updated or newer application version relative to the other vADC. For example, a vADC 920 runs a newer application version of the same version as the vADC 910, but the newer version contains fixed bugs identified in the older version.

The management module 930 and traffic distributor 940 are processes that manage and schedule the execution of the vADCs 910 and 920 as described in detail above. According to this embodiment, the management module 930 and the traffic distributor 140 are configured to enable independency of execution of the vADCs 910 and 920. Specifically, the management module 930 manages the application versions of the vADCs in the virtualized ADC device. With this aim, the management module 930 maintains, at least the application versions supported by the virtualized vADC device and a version number of each application version. The version information related to a vADC is gathered by the management module 930 during the creation of the vADC or once the vADC is created. The version information may be utilized by the traffic distributor 940 for communication with the vADCs 910 and 920 and by a system administrator. In one embodiment, the version information for each vADC being executed is displayed through a control panel, e.g., in a form of a GUI.

As mentioned above, traffic can be forwarded from one vADC to another. As each of the vADCs 910 and 920 are of different application versions, each may utilize different data structures or formats to encapsulate the traffic and other information. However, all vADCs should recognize and interpret the received traffic regardless of the data structure it is included in. In addition, the traffic distributor 940 also encapsulates the traffic and other information required for the traffic processing in a data structure that may be illegible to the vADC 910. To overcome this problem, it is important to maintain consistency in the communication between the vADCs 910 and 920. With this aim, the traffic distributor 940 maintains consistency in the communication between the vADCs 910 and 920.

In one embodiment, the traffic distributor 940 communicates with the vADCs 910 and 920 using a virtualization communication protocol (VCP). The VCP defines a set of data structures and rules for exchanging information among the vADCs as well as between vADCs and the traffic distributor. In another embodiment, the traffic distributor 940 is programmed to recognize the different data structures of the different application versions of the vADCs. A data structure that includes traffic, e.g., from vADC 910 and directed to, e.g., vADC 920 that utilizes a different data structure is received by the traffic distributor 940, which modifies the received data structure to a format readable by the vADC 920. Then, the traffic distributor 940 sends the modified data structure to the vADC 920.

In accordance with one embodiment, a hardware infrastructure of a virtualized ADC device maintains multiple software images, each of which represents a different application version of a vADC. For example, the hardware infrastructure maintains software images of vADCs 910 and 920. In addition, the hardware infrastructure maintains one or more software images of the traffic distributor and management module.

The virtualized ADC device is installed with only one version of the traffic distributor and management module. However, a user (e.g., a system administrator) can select which application version of a vADC to run on the virtualized device. Based on the user selection, the management module decides which version of the vADC to create and run. The process for creating a vADC is described in detail above. The version information associated with the newly created instance of a vADC is gathered and shared with the distribution module.

Figure 10:
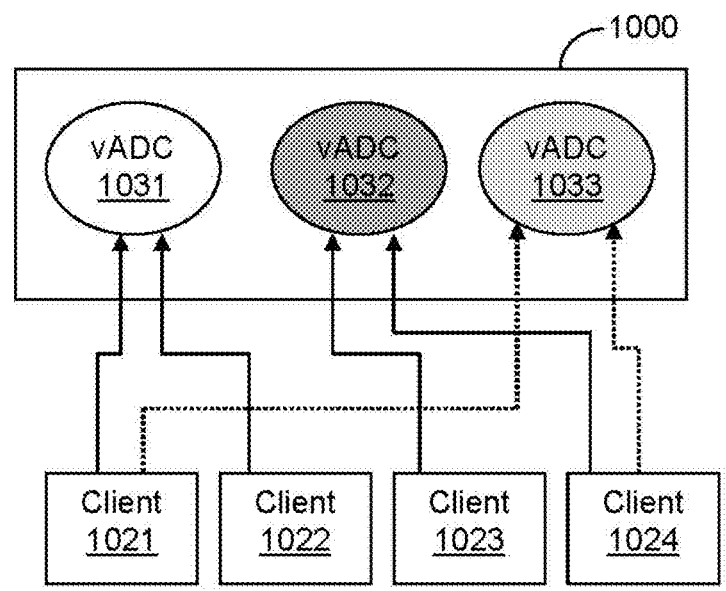
FIG. 10 is a diagram utilized to describe a process for enabling software upgrades of vADCs.

The embodiments of independent execution of vADCs can be further utilized in order to enable software upgrades without affecting clients utilizing the services of vADCs and reducing the overall downtime of a datacenter. As schematically illustrated in FIG. 10, a virtualized ADC device 1000 is deployed in a datacenter that serves clients 1021, 1022, 1023, and 1024. The datacenter may be part of an infrastructure that provides cloud computing services.

The virtualized ADC device 1000 executes vADCs 1031 and 1032, each of which runs a different application version. As a non-limiting example, traffic from clients 1021, 1022 is handled by the vADC 1031 and traffic from clients 1023, 1024 is handled by the vADC 1032. When a newer version of a vADC, e.g., a vADC 1033, is introduced, an image of this version is stored in the virtualized ADC device 1000. The user can select to create an instance of the vADC 1033. For example, the vADC 1033 may be a software update of the vADC 1031. Once created the vADC 1033 is executed independently of the vADCs 1031 and 1032. The clients 1021, 1022, 1023, and 1024 may migrate to a new vADC, but this is performed without halting the operation of any of the vADCs. For example, traffic from clients 1021 and 1024 can now be directed to the vADC 1033, for example, as the vADC 1033 provides traffic processing services not supported by the other vADCs. Again, it is important to emphasize that during the creation of the vADC 1033 and the migration of clients 1021 and 1024, the vADCs 1031 and 1032 do not halt their operation, and the creation of the vADC 1033 is transparent to the clients. Thus, the device 1000 and the datacenter do not need to be shut down when new application versions of a vADC should be installed in the datacenter.

Figure 11:
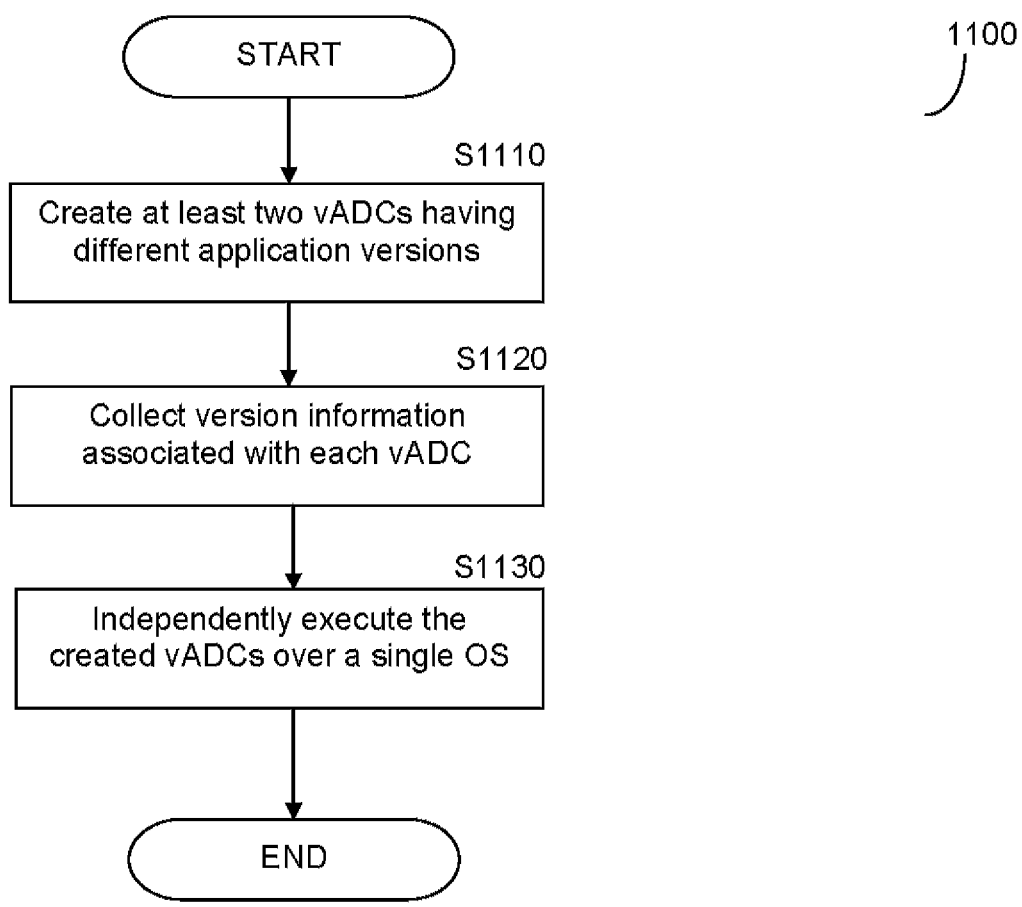
FIG. 11 is a flowchart illustrating a method for independently executing vADCs over a virtualized ADC device.

FIG. 11 is a non-limiting and exemplary flowchart 1100 illustrating a method for executing vADCs of different application versions by a virtualized ADC device according to one embodiment. At S1110, at least two vADCs each of which has a different application version relative to the other are created by a management module (e.g., module 120). As mentioned above, a software image of each of the vADCs is stored in the virtual ADC device, and the creation of the vADC is performed upon selection of the user. The process for creating a vADC is described in detail above with respect to FIG. 4. A vADC created by the management module is a self-contained application that includes all resources, such as executable code, configurations, and user privileges. The vADC does not run any operation system.

At S1120, the version information associated with the created vADCs is collected and transferred to the traffic distributor. The version information includes at least a version number, configuration, the format of the internal communication protocol (e.g., a protocol version utilized for communication with other vADCs), the date the vADC was created, the date the vADC was installed, and so on.

At S1130, the created vADCs are independently executed over a single operating system of the virtualized ADC device. The execution of the vADCs is managed and controlled by the traffic distributor. As noted above, during the execution of the vADCs, additional new vADCs having different application versions may be created and executed over the operating system of the computing device.

The foregoing detailed description has set forth a few of the many forms that the invention can take. It is intended that the foregoing detailed description be understood as an illustration of selected forms that the invention can take and not as a limitation to the definition of the invention.

Most preferably, the various embodiments of the invention can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for independently executing virtual application delivery controllers (vADCs) having different application versions over a computing device running an operating system, comprising:

creating by virtualization infrastructure in the computing device a plurality of vADCs having different application versions, wherein each vADC is created from a software image maintained in a hardware infrastructure of the computing device;

gathering version information associated with each of the plurality of vADCs, wherein the version information is descriptive of each of the plurality of vADCs and includes for each vADC at least an application version that a respective vADC is configured to run;

allocating to each of the plurality of vADCs at least one application delivery controller (ADC) capacity unit, wherein the at least one ADC capacity unit is an atomic, non-dividable block that encapsulates various parameters of computing resources that can be utilized for the execution of the at least one ADC capacity unit;

independently executing each of the plurality of vADCs, irrespective of the application version, over the operating system of the computing device without a guest operating system being interposed between the operating system of the computing device and any of the vADCs using the computing resources included in the at least one allocated ADC capacity unit to each of the plurality of vADCs; and controlling the execution of the plurality of the vADCs over the operating system of the computing device by the virtualization infrastructure using in part the version information.

2. The method of claim 1, wherein each of the plurality of vADCs is a self-contained application that includes at least executable code, configuration files, and user privileges programmed for its respective application version.

3. The method of claim 2, wherein each of the plurality of vADCs is programmed to perform network processing tasks including at least one of: load balancing of the incoming traffic, compression of the incoming traffic, and caching of the incoming traffic, wherein each vADC performs a network processing task defined by its respective application version.

4. The method of claim 1, wherein the plurality of vADCs are executed on the operating system of the computing device without any involvement of a hypervisor.

5. The method of claim 1, wherein the version information of each of the vADCs includes at least one of a version number, configuration of the vADC, and a protocol version utilized for communication with other vADCs, and a creation date.

6. The method of claim 1, wherein the plurality of vADCs created by the virtualization infrastructure are selected by a user.

7. The method of claim 1, wherein the virtualization infrastructure includes:

a management module programmed to create the plurality of the vADCs and gather at least the version information for each of the plurality of vADCs; and a traffic distributor programmed to distribute incoming traffic to one of the plurality of vADCs and schedule the execution of the plurality of vADCs on one or more core processors in the hardware infrastructure.

8. The method of claim 7, wherein the traffic distributor further allows consistency in the communication between the plurality of vADCs.

9. The method of claim 8, further comprises:

recognizing a communication format employed by a source vADC and directed to a destination vADC using the source and destination vADCs;

determining if the communication format employed by the source vADC is recognizable by the destination vADCs; and manipulating the communication format employed by the source vADC to meet the communication format of the destination vADC, wherein the source vADC and the destination vADC are part of the plurality of vADCs.

10. The method of claim 9, wherein creating a vADC of the plurality of vADCs further comprises:

assigning at least one network parameter to the vADC;
assigning the at least one ADC capacity unit to the vADC;
instantiating the vADC from a software image related to an application version of the created vADC, the software image is maintained in the hardware infrastructure; and
assigning a unique identification (ID) number to the vADC.

11. The method of claim 10, wherein the at least one network parameter is at least a medium access network (MAC) address.

12. The method of claim 11, wherein the at least one ADC capacity unit is an atomic block encapsulating a plurality of hardware resource parameters related to hardware resources of the hardware infrastructure.

13. The method of claim 11, wherein the hardware resource parameters include at least one core processor, or portion thereof, a throughput of a network interface, and a percentage of memory.

14. The method of claim 12, wherein the hardware resource parameters further include at least one of: a number of concurrent connections, storage space on a storage device, a number of secure sockets layer (SSL) connections, a compression throughput capacity to process the incoming traffic, a number of virtual IP addresses, a real IP addresses, and a proxy IP addresses.

15. The method of claim 10, wherein the vADCs is further assigned with one more ADC capacity unit configurations, wherein each of the ADC capacity unit configurations includes a different number of capacity units that can be allocated to the vADC.

16. The method of claim 1, further comprises:
creating at least one more vADC having an application version different than the application versions of the plurality of vADCs, wherein the creation of the at least one more vADC is performed during the execution of the plurality of vADCs without halting their execution.

17. A non-transitory computer readable medium having stored thereon instructions for causing one or more processing units to perform a process for independently executing virtual application delivery controllers (vADCs) having different application versions over a computing device running an operating system, comprising:
creating by virtualization infrastructure in the computing device a plurality of vADCs having different application versions, wherein each vADC is created from a software image maintained in a hardware infrastructure of the computing device;
gathering version information associated with each of the plurality of vADCs,
wherein the version information is descriptive of each of the plurality of vADCs and includes for each vADC at least an application version that a respective vADC is configured to run;
allocating to each of the plurality of vADCs at least one application delivery controller (ADC) capacity unit, wherein the at least one ADC capacity unit is an atomic, non-dividable block that encapsulates various parameters of computing resources that can be utilized for the execution of the at least one ADC capacity unit;
independently executing each of the plurality of vADCs, irrespective of the application version, over the operating system of the computing device without a guest operating system being interposed between the operating system of the computing device and any of the vADCs using the computing resources included in the at least one allocated ADC capacity unit to each of the plurality of vADCs; and
controlling the execution of the plurality of the vADCs over the operating system of the computing device by the virtualization infrastructure using in part the version information.

18. The non-transitory computer readable medium of claim 17, wherein each of the plurality of vADCs is a self-contained application that includes at least executable code, configuration files, and user privileges programmed for its respective application version.

19. The non-transitory computer readable medium of claim 17, wherein the plurality of vADCs are executed on the operating system of the computing device without any involvement of a hypervisor.

20. The non-transitory computer readable medium of claim 17, further comprises:
creating at least one more vADC having an application version different than the application versions of the plurality of vADCs, wherein the creation of the at least one more vADC is performed during the execution of the plurality of vADCs without halting the execution of the plurality of vADCs.

* * * * *